(No Model.)
T. A. EDISON.
WEBERMETER.
No. 281,352. Patented July 17, 1883.
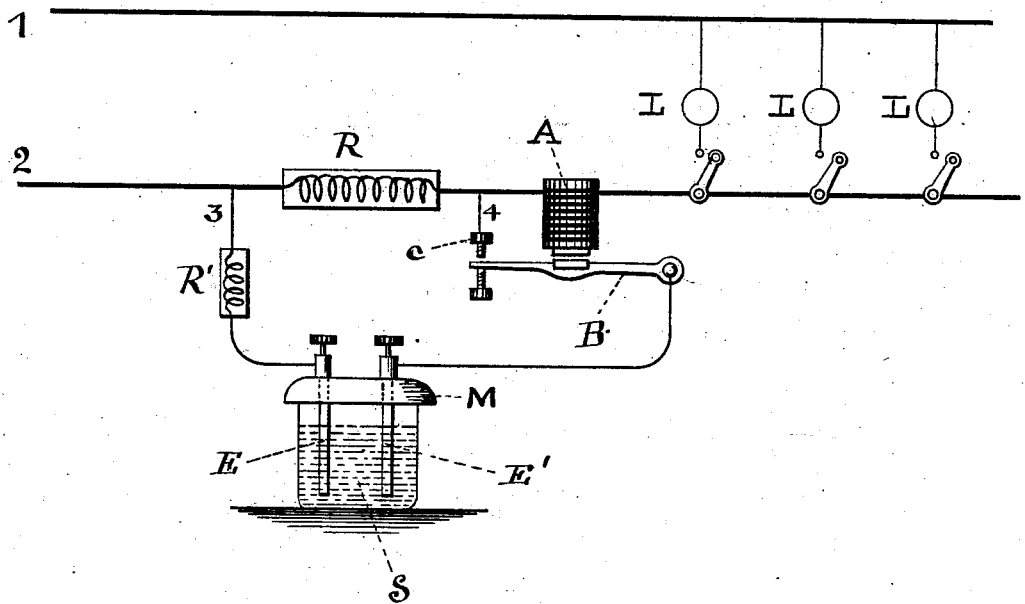
WITNESSES:
INVENTOR:
BY T. A. Edison
ATTORNEYS.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

WEBERMETER.

SPECIFICATION forming part of Letters Patent No. 281,352, dated July 17, 1883.

Application filed November 11, 1881. (No model.)

*To all whom it may concern:*

Be it known that I, THOMAS A. EDISON, of Menlo Park, in the county of Middlesex and State of New Jersey, have invented a new and useful Improvement in Webermeters, (Case No. 356;) and I do hereby declare that the following is a full and exact description of the same, reference being had to the accompanying drawings, and to the letters of reference marked thereon.

This improvement relates to the electroplating or metal-depositing cell electric meter for measuring the amount of electrical energy consumed in my system of electric lighting, in which meter the metal is taken from one electrode of the cell and is deposited upon the other by the action of the current. This depositing-cell is arranged so that only a small part of the current will pass through it, the total current being determined by the measurement of a definite fractional portion thereof, as set forth in my application filed March 20, 1880, (Serial No. 5,539.)

Now, the object of the present invention is to produce an electric meter of this character which will produce a correct deposit of metal by the use of a much weaker current (or smaller portion of the entire current) than is possible with the employment, as heretofore practiced by me, of simple copper electrodes, thus causing a considerable saving in electrical energy. This I accomplish by using amalgamated electrodes in the depositing-cell. The electrodes which I prefer to use, and which are the most accurate, are made of metallic zinc placed in a strong solution of sulphate of zinc. I prefer that such electrodes, before being used in the meter, should have a heavy coating of deposited zinc placed on them by the action of an electric current, which zinc will be thoroughly amalgamated while being deposited. This is done by coating the plates with mercury and then depositing the zinc thereon, and removing the plates from the depositing-cell and coating with mercury as often as is necessary to secure a thorough amalgamation of the zinc. Plates thus prepared are precisely alike and give accurate results. Other metals which can be amalgamated—such as cadmium, lead, and tin—are capable of being used in this connection when immersed in solutions of their salts, not acting upon the mercury, such as the sulphate of cadmium and acetate of lead; but none are as accurate as zinc treated as described. The depositing-cell meter is arranged in a shunt from one of the conductors of a house or other consumption circuit, a resistance being placed in the line to shunt a definite small portion of the entire current through the meter. A wire resistance is placed in the same shunt as the depositing-cell, and is arranged to compensate for the effect of changes in temperature on the resistance in the cell-circuit. The wire being increased in resistance by a rise of temperature, and the cell proportionately decreased, and a fall of temperature having exactly the opposite effect on the wire and cell, the total resistance of the shunt will always be the same, and consequently the same fraction of the current will always pass through it. Two or more depositing-cells may be used instead of one cell in the same shunt, or two cells may be placed in separate shunt-circuits, so that one will act as a check upon the other, as set forth in my application filed August 30, 1881, (Serial No. 40,990.) Although with the amalgamated-zinc electrodes there is the minimum amount of counter electro-motive force to the cell, still it is practically impossible to produce two electrodes which are so precisely alike that there will be no counter force at all.

To prevent the establish ing by the cell of a counter current when no lamp is on and no current is flowing through the house or consumption circuit, I provide a device for automatically breaking the shunt when the circuit of the last lamp is broken and for closing such shunt when the first lamp-circuit is completed. This device may consist of an electro-magnet placed directly in the house or consumption circuit, or in a multiple-arc circuit therefrom, or in a shunt from one of the conductors of the consumption-circuit, and operating a lever arranged to make and break the meter-shunt; or this magnet may be the resistance around which the meter-shunt is placed.

The drawing shows a diagrammatic view of the meter and connections.

1 2 are the conductors of the house or consumption circuit, and L lamps or other translating devices placed in multiple-arc or derived circuits.

R is resistance in conductor 2.

3 4 represent the meter-shunt.

M is the depositing-cell forming the meter, having amalgamated-zinc electrodes E E′ and a solution of sulphate of zinc, S.

R′ is the wire resistance in shunt 3 4, to compensate for the varying resistance of S.

A is the electro-magnet in the conductor 2, operating lever B, placed in shunt 3 4, and making and breaking said shunt at contact c.

What I claim is—

1. In an electric meter, an electro-depositing cell provided with amalgamated metallic electrodes, substantially as set forth.

2. In an electric meter, an electro-depositing cell having amalgamated-zinc electrodes, substantially as set forth.

3. The combination, with an electro-depositing cell acting as a meter, of a circuit closer and breaker arranged to break the meter-circuit completely when no translating devices are in operation, and to close such meter-circuit completely when the first translating device is put in operation, substantially as set forth.

4. The combination, with an electric circuit including a definite and known resistance, of one or more electro-depositing cells arranged in a shunt around such resistance, and an electro-magnet in the main circuit, or in a shunt or multiple-arc circuit therefrom, operating to open and close the meter-shunt, substantially as and for the purpose set forth.

This specification signed and witnessed this 5th day of October, 1881.

THOS. A. EDISON.

Witnesses:
RICHD. N. DYER,
H. W. SEELY.